United States Patent [19]

Boykin

[11] 4,382,672

[45] May 10, 1983

[54] ILLUMINATION ARRANGEMENT FOR ELIMINATION OF GRAY BORDERS IN COPYING DEVICE

[75] Inventor: Richard C. Boykin, Rochester, N.Y.

[73] Assignee: Xerox Corporation, Stamford, Conn.

[21] Appl. No.: 191,559

[22] Filed: Sep. 29, 1980

[51] Int. Cl.³ ........................ G03B 27/54; G03B 27/70

[52] U.S. Cl. ........................................ 355/1; 355/3 R; 355/67

[58] Field of Search .................... 355/1, 3 R, 7, 67, 68, 355/69, 70, 71, 50, 49, 51, 60, 66

[56] References Cited

U.S. PATENT DOCUMENTS

| | | | |
|---|---|---|---|
| 3,584,950 | 6/1971 | Gundlach . | |
| 3,642,371 | 2/1972 | Jones et al. . | |
| 3,788,737 | 1/1974 | Kidd | 355/3 R |
| 3,947,106 | 3/1976 | Hamaguchi et al. | 355/1 |
| 3,977,777 | 8/1976 | Tanaka et al. | 355/1 |
| 3,981,575 | 9/1976 | Tanaka et al. | 355/1 |
| 3,998,541 | 12/1976 | Michaloski et al. | 355/67 |
| 4,118,119 | 10/1978 | Maiorano | 355/3 R |
| 4,193,679 | 3/1980 | Mochizuki et al. | 355/1 |

FOREIGN PATENT DOCUMENTS

| | | |
|---|---|---|
| 1296955 | 11/1972 | United Kingdom . |
| 2031612A | 4/1980 | United Kingdom . |
| 2045450A | 10/1980 | United Kingdom . |

OTHER PUBLICATIONS

Research Disclosure, May 1977, 15765, Alfred Michaloski.

*Primary Examiner*—Alan Mathews

[57] ABSTRACT

In a system which uses a linear lens array or light transmitter array, reflective elements are placed at the array ends so as to intrude a slight distance into the optical path. Light reflected from these elements is used to eliminate unwanted edge borders on an underlying photoreceptor surface.

6 Claims, 2 Drawing Figures

ILLUMINATION ARRANGEMENT FOR ELIMINATION OF GRAY BORDERS IN COPYING DEVICE

BACKGROUND OF THE INVENTION

This invention relates to an electrophotographic reproducing apparatus and, more particularly, to a document exposure system which eliminates gray borders on a photoreceptor.

A problem common to most commercial copiers is that illumination of a document lying on a transparent platen produces a shadow along the edges of the document. This shadow area is transferred to the photoreceptor in the form of unexposed areas along the edges of the document image. Unless discharged in some manner, these edge "images" are developed and result in an objectionable gray border or edge on the copy sheets.

A number of approaches to solve the foregoing problems of edge or border development have been provided: A typical solution, for copiers with standard imaging lenses, is to position the lens in the optical system so that a slight magnification, usually 1.05×, is present. This magnification setting moves the gray borders outside of the area of the copy paper. Besides the obvious problem of departing from a desired 1.00× magnification, this technique cannot be used for optical systems wherein the magnification cannot be varied from 1.00×, e.g. when using gradient index lens arrays of the type described in U.S. Pat. Nos. 3,947,106 and 3,977,777 and in strip lenses of the type described in U.S. Pat. No. 3,584,950.

Other solutions to the shadow area problem are disclosed in U.S. Pat. Nos. 3,642,371; 3,788,737 and 4,118,119. These patents disclose and claim various ways of modifying the platen cover to dissipate unwanted edge charge areas. In U.S. Pat. No. 3,642,371, the underside of the platen cover is covered with a diffusely reflective material. U.S. Pat. No. 3,788,737 incorporates an electroluminescent strip in the platen cover which, when excited, provides light to expose edge areas. U.S. Pat. No. 4,118,119 discloses a facetted reflector built into the platen, the reflector set at particular orientations relative to each other.

These solutions are relatively costly and are limited to a specific document and paper width size.

It is therefore one object of the present invention to provide a simple inexpensive device to eliminate gray borders on copy paper.

It is a further object to provide for gray border elimination for copying systems wherein the optical system magnification is restricted to 1.00×.

It is a still further object to provide an illumination arrangement for eliminating gray borders for a variety of document and copy sheet formats.

SUMMARY

The present invention achieves these objects by providing an illumination arrangement which includes a document illumination means and a linear image transmitter which transmits a reflected image onto a photoreceptor surface. Gray borders are eliminated by introducing reflective tabs into the optical path to produce a concentrated area of light on the underlying photoreceptor surface dissipating charges on said surface.

DRAWINGS

DESCRIPTION

Figure 1:
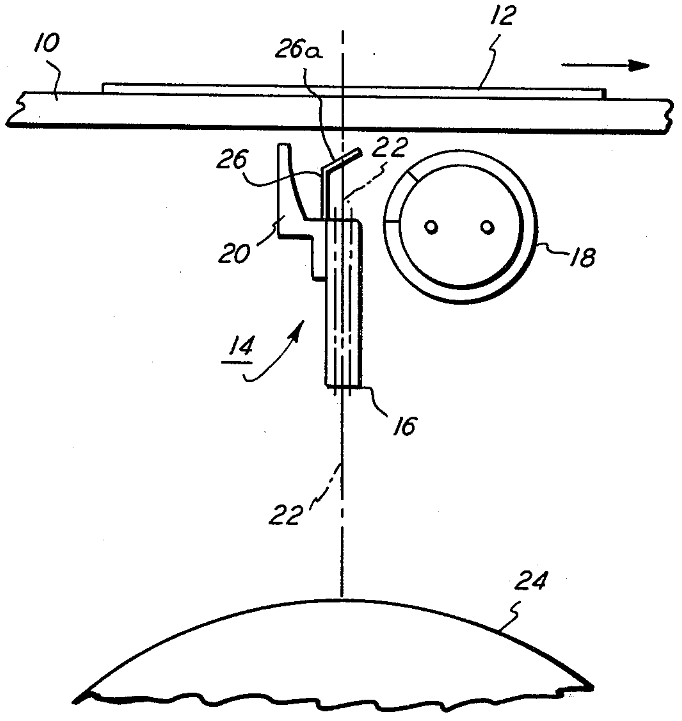
FIG. 1 is a schematic end view of a copier illumination system utilizing a linear image transmitter and associated reflective member.
Figure 2:
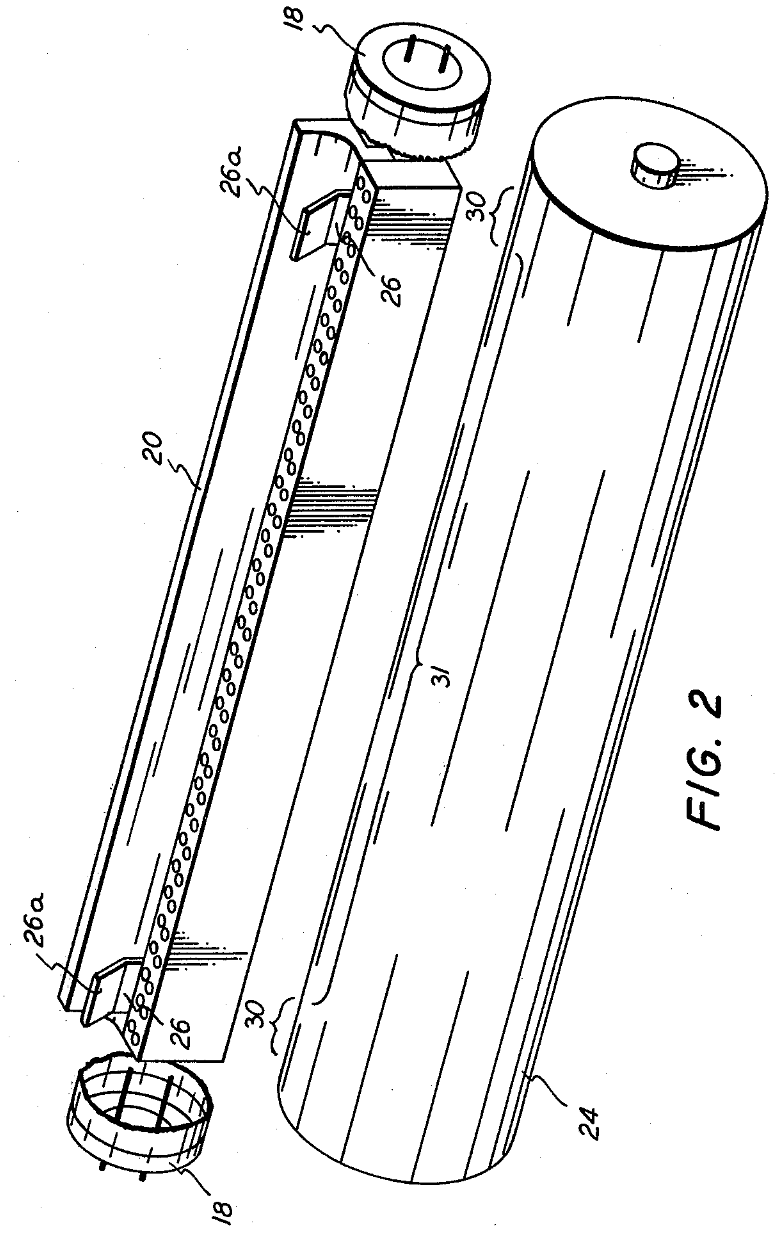
FIG. 2 is a partial frontal view of the system of FIG. 1 omitting the platen and illumination source for ease of description.

Referring now to FIGS. 1 and 2, a transparent platen 10 having a document 12 thereon is moved in the indicated direction past optical system 14. System 14 consists of a gradient index lens array 16 which may be of the type commercially available from the Nippon Sheet Glass Company, Ltd. and produced under the tradename SELFOC. Apertured lamp 18 and cylindrical fresnel reflector 20 cooperate to produce an intense narrow band of illumination during scanning.

An optical path 22 extends from the platen through lens array 16 to the surface of a drum photoreceptor 24. According to the invention, reflective tabs 26 are attached to the sides and at both ends of array 16. The tabs are bent so as to form edges *26a* which extend across the entire width of the array. The surface of the tab facing the light source comprises a diffuse or specular reflective material or is coated with such a material. Edges *26a* extend slightly into the imaged area as described in further detail below.

In operation, document 12 is moved through the illumination zone resulting in successive strips of the document being scanned. The light pattern reflected from the document is transmitted by array 16 to the surface of photoreceptor 24 which rotates in synchronism with the rate at which the platen 10 is moved. Tabs 26 reflect a concentrated segment of light emanating from lamp 18 onto the portion of photoreceptor 24 lying beneath the tab dissipating the charge on these areas. In a preferred embodiment, as shown in FIG. 2, the area of charge dissipation on the photoreceptor surface is shown as segments 30 while the imaged portion is shown as 31. Tabs 26 are of sufficient width and are so positioned that the concentrated area of reflected light extends into the latent image area on the drum by approximately two millimeters. This 2 mm deleted area will usually correspond to a white area on the document and therefore will not entail any loss of information.

The reflective tabs may also present a diffusely reflective surface to lamp 18 thereby becoming, in effect, the source.

The location of tabs 26 may be adjusted in either direction along the length of the lens array to accommodate documents of varying size.

Although the invention has been disclosed in a system using a gradient index imaging lens array, the reflective tabs may also be used in optical systems employing a linear type lens such as the aforementioned strip lens in U.S. Pat. No. 3,584,950 as well as image bar-type lenses having similar longitudinal dimension and narrow acceptance cones.

What is claimed is:

1. An improved illumination and imaging system including an elongated lamp positioned adjacent a document support plane, said lamp adapted to provide an illumination band to a linearly extending incremental portion of the document to be copied, a linear image transmitter having an entrance and exit face positioned between said document support plane and a photosensitive imaging plane and along an optical path so that light reflected from said linearly extending incrementally illuminated document portion enters the entrance face of said transmitter and is transmitted therethrough onto the photosensitive surface of said imaging plane, means for moving said document with respect to said linear transmitter whereby an area of the imaging plane surface is exposed to form a latent image of said document, the side edges of said exposed image being bounded by an unexposed area, the improvement comprising a pair of reflective members connected, respectively to opposite ends of said linear image transmitter, and adapted to reflect a portion of said lamp illumination into the respective end portions of said entrance face, whereby said reflected portions are transmitted onto the unexposed side edges of said exposed image so as to discharge said unexposed areas.

2. The improved system of claim 1 wherein said light reflected from said reflective members extends into the latent image on the imaging plane surface a distance of approximately two millimeters.

3. The improved system of claim 1 wherein said reflective members project upward over each end portion to form a roof completely covering the width of said end portions.

4. The improved system of claim 1 wherein said reflective members are slidably mounted to permit movement to new locations.

5. The improved system of claim 1 wherein said reflective members present a diffusely reflective surface to said lamp illumination.

6. The improved system of claim 1 wherein said image transmitter is a gradient index lens array.

* * * * *